June 27, 1950     A. E. BENSON ET AL     2,512,762
APPARATUS FOR MAKING WIRE TIRE FABRIC
Filed Feb. 26, 1947     2 Sheets-Sheet 1
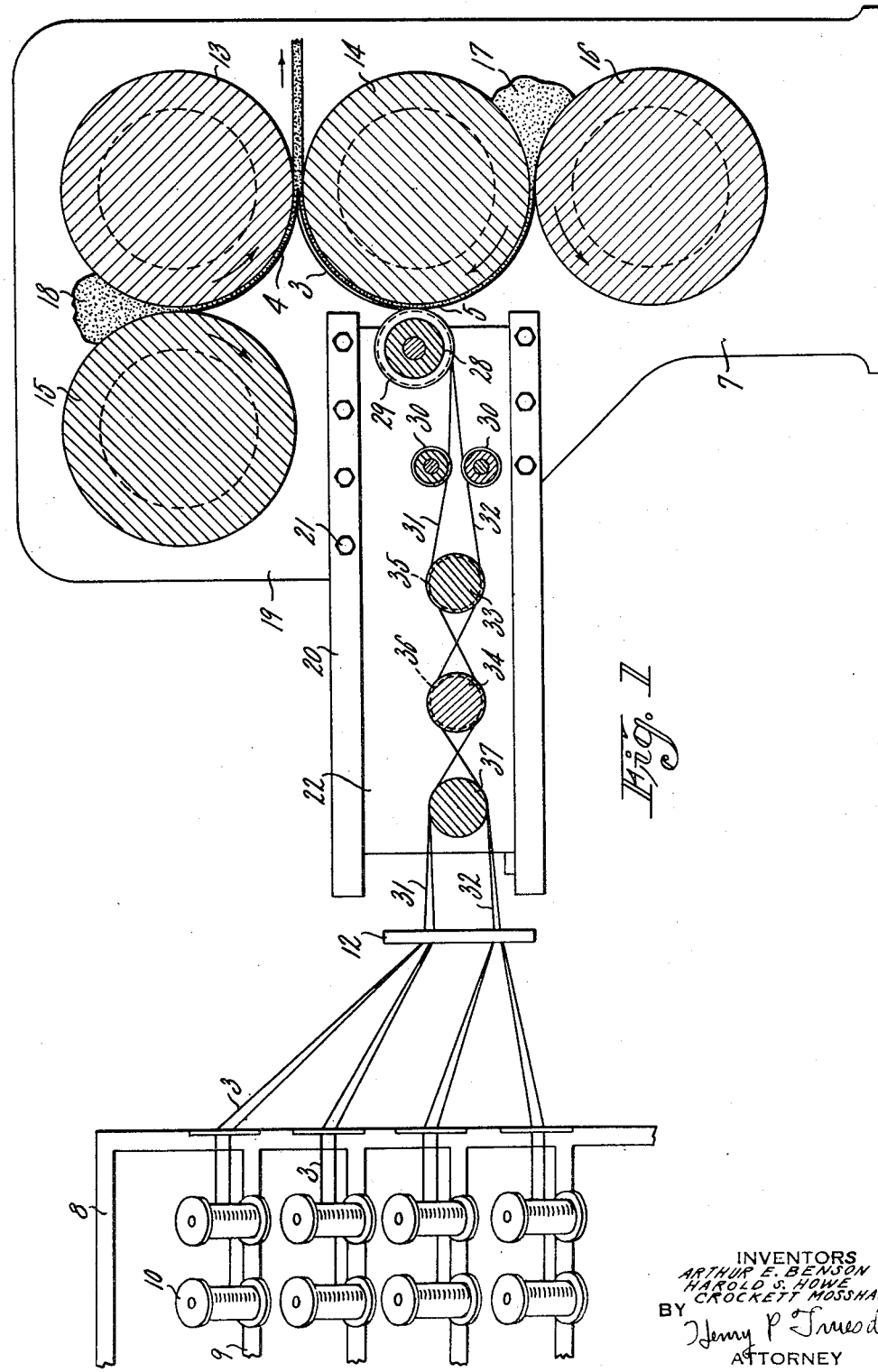
Fig. I
INVENTORS
ARTHUR E. BENSON
HAROLD S. HOWE
CROCKETT MOSSHART
BY Henry P Truesdell
ATTORNEY

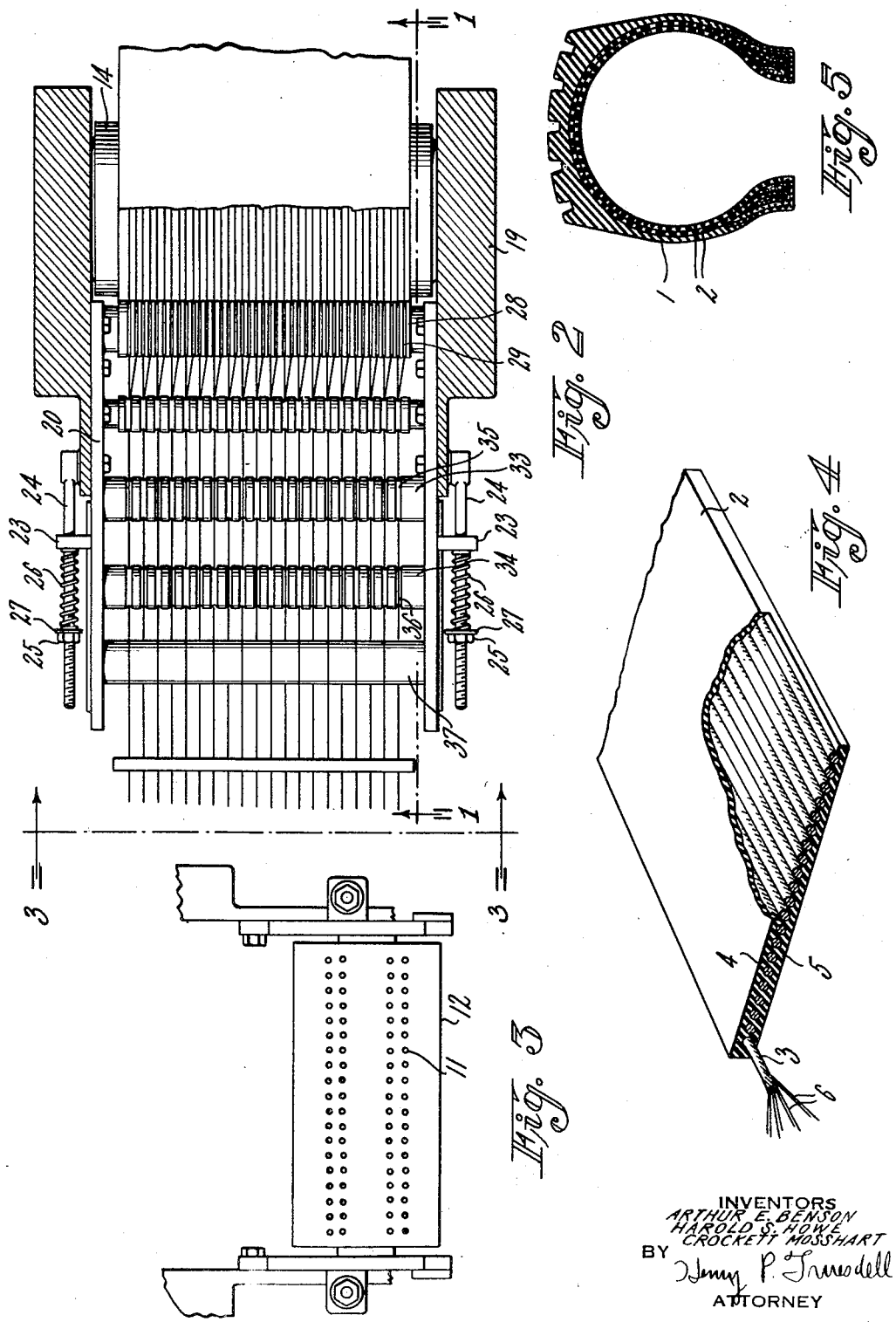

Patented June 27, 1950

2,512,762

UNITED STATES PATENT OFFICE 2,512,762

APPARATUS FOR MAKING WIRE TIRE FABRIC

Arthur E. Benson, Harold S. Howe, and Crockett Mosshart, Detroit, Mich., assignors to United States Rubber Company, New York, N. Y., a corporation of New Jersey Application February 26, 1947, Serial No. 731,024

3 Claims. (Cl. 154—1.75)

Our invention relates to apparatus for manufacturing wire tire fabric for use in tire casings and more particularly to apparatus employed in the manufacture of wire ply fabric.

The use of wire reinforcement in tires, as incorporated in the form of a metallic wire or cable ply fabric, has heretofore been suggested to replace the conventional textile ply fabric. Due to the greatly increased strength of the wire fabric such constructions make it possible to reduce the number of plies of wire fabric required in tire carcasses when compared with conventional textile fabric plies. This results in reducing the thickness of the tire casing so that heat generated by internal friction in the plies is more readily dissipated increasing the life of the tire. The construction results in a strong carcass of relatively thin cross-section but in which the wire fabric side walls provide strength at least as great as, or greater than, conventional textile fabric tires of heavier cross-section.

In substituting the reinforcing wire or cable for the textile cord, a variety of problems arise in producing a satisfactory ply fabric. The reinforcing metallic wire presents a comparatively smooth though wavy surface so that it is more difficult to bond it to the rubber. Moreover, the reinforcing wires are relatively stiff and springy when compared to conventional textile cords, so that they are more difficult to handle and have a tendency to lie unevenly when embedded in the rubber layer making up the ply fabric.

In constructing a conventional textile ply fabric, it is customary to embed a plurality of textile cords between layers or sheets of rubber with the cords lying side by side in parallel relationship so that a flexible weftless fabric is obtained which is cut up into sheets and used to build up the various plies of the tire carcass. In substituting the wire for the textile cord it was found advisable to embed the wire cables in rubber in the same manner so that the cables were arranged in side by side parallel relationship. This meant that wire fabrics so constructed could be readily used on conventional tire making machinery without any substantial change in present manufacturing processes.

At the outset, the wire fabric was constructed by winding a layer of unvulcanized sheet rubber around a large drum of approximately 8 feet diameter. A stranded reinforcing wire cable was then wound around the drum completely across the width of the rubber sheet so that the convolutions of the spiral thus formed provided a plurality of wire reinforcing elements arranged side by side in parallel relationship. An overlying layer of sheet rubber was then applied to the drum and rolled or "stitched" down into intimate contact with the wire cable reinforcements. The completed fabric was removed from the drum and cut to desired dimensions.

A wire ply fabric so constructed had the disadvantage that the wires were not always arranged in precise parallel relationship during the winding operation. Moreover, it was difficult to control the tension at which the wire was wound so that there was tendency for the wire to cut through the underlying rubber sheet. The process was slow and required considerable handling of the material thereby greatly increasing the cost of the product.

Another attempt was made to build a suitable wire reinforced fabric by utilizing conventional equipment in which the individual reinforcing wire cables were substituted for the individual textile cords. To this end, apparatus such as illustrated in the Midgley Patent 1,742,777 issued January 7, 1930 was employed in which the reinforcing elements are embedded between sheets of rubber when passed between calender rolls. However, it was found in actual practice, that the wire ply fabric could not be manufactured on such equipment without considerable modification thereof due to the fact that the wire cables could not be positively positioned chiefly due to their springy characteristics. It is to a modification of this apparatus that our invention relates. When constructed in accordance with our invention, the apparatus provides suitable means for tensioning, guiding, straightening and controlling the wire reinforcing elements as they are united with the rubber sheets making up the ply so that a high quality wire fabric is obtained.

Therefore, the object of our invention is the provision of new and improved apparatus for manufacturing wire ply fabric in which means is provided for constructing the fabric with the individual reinforcing wire cables perfectly aligned in side by side parallel relationship.

In the accompanying drawing:

Fig. 1 is a view along the line 1—1 of Fig. 2 illustrating a side view of apparatus constructed in accordance with our invention and which is adapted for the manufacture of ply fabric incorporating reinforcing wires or cables;

Fig. 2 is a plan view of a portion of the apparatus of Fig. 1;

Fig. 3 is a sectional view of part of the apparatus taken along the line 3—3 of Fig. 2;

Fig. 4 is a perspective view showing the construction of the wire ply fabric in detail; and Fig. 5 is a view in cross section of a tire carcass utilizing plies having metallic reinforcing wires or cables.

Referring to the drawing, Fig. 5 illustrates a tire carcass 1 provided with a plurality of plies 2 comprising wire fabric. The construction and arrangement of the tire carcass and the number of plies utilized forms no part of the present invention, the number of plies being determined by the size and rating of the tire. The particular wire ply fabric 2, which is manufactured on a machine constructed in accordance with our invention, is illustrated in greater detail in Fig. 4. The individual reinforcing elements 3 which comprise metallic wires or cables, are assembled between upper and lower layers 4 and 5, respectively, of sheet rubber. It should be manifest that either natural or synthetic rubber may be used as well as other suitable plastic material. The rubber sheets are forced together during the manufacturing operation so that the individual reinforcing elements are completely embedded in the rubber which thus forms a unitary mass completely surrounding and protecting the individual wires. Each wire or cable 3 comprises a plurality of strands 6 which are twisted or cabled together to form the reinforcing elements. The particular construction of the reinforcing wire 3 forms no part of the present invention. It should be noted, however, that the cable 3 may be of the so-called "S and Z" construction, or regular lay, in which the filaments of the strands are twisted in one direction and the strands themselves cabled together with a twist in the opposite direction. Alternatively, the cable may have a so-called Lang lay in which the filaments of the strands are twisted together in the same direction as that in which the strands are cabled together. Another suitable cable construction is that shown by the Hauvette Patent 2,143,694 dated January 10, 1939.

In constructing a wire reinforced fabric of the type illustrated by Fig. 4, it is important that the individual wires or cables be arranged in side by side parallel relationship and that they be spaced very uniformly across the width of the fabric sheet. If the individual cables are not uniformly spaced a weak spot may develop in the tire. For example, if the spacing between the cables is excessive the reinforcing action of the cables is insufficient at that point so that premature failure of cables may take place. This is due to the fact that the cables of the upper ply are not eveny and uniformly supported by the cables of the underlying ply so that the upper ply cables have a tendency to flex and break. On the other hand, if the wires are too close, insufficient rubber may be forced down between the wires so that they frictionally engage one another and through chafing promote disintegration of the ply. Moreover, it is important that the cables be located in the center of the thickness of the rubber sheet so that they are not exposed at either the bottom or top sides of the sheet. The aforementioned requirements add greatly to the difficulty of manufacture because the individual cables are very stiff and springy, when compared with textile reinforcing cords, and are much less flexible. It thus became necessary to provide special equipment accurately to align and straighten the cables before they could be incorporated into the wire fabric. In order to improve the chemical bond between the individual wires and the rubber matrix it is customary to plate or treat the wire cables with brass or an organic adhesive so that excellent adhesion is obtained between them and the rubber upon vulcanization. The individual strands of the wire may be plated or treated before or after they are twisted together.

Referring to Fig. 1, we have illustrated what may be termed a "creel-to-calender" machine comprising a calender 7 and creel 8. The creel 8 is provided with a plurality of racks 9 for supporting a series of spools or reels 10 on which the individual wires or cables 3 are wound. The number of spools employed will depend upon the number of cables to be incorporated in the sheet of fabric. The individual cables 3 are fed through openings 11 in a spacing or gathering rack 12, best shown by Fig. 3. They are then fed to the calender through a guiding, tensioning and straightening means to be described later. The calender 7 is of conventional construction similar to that shown in the aforementioned Midgley Patent 1,742,777. Only the essential features thereof have been shown and which are necessary to an understanding of the present invention.

To this end, we have illustrated the calender rolls 13 and 14 between which the cables 3 pass and which cooperate with feed rolls 15 and 16 serving to provide the sheets of rubber for enclosing the wire cables. A bank of rubber mix 17 is placed at the entrance between the rolls 14 and 16; inasmuch as the feed roll 16 rotates at a slightly slower speed than the calender roll 14 the rubber is sheeted out over the calender roll to form the aforementioned lower sheet 5 of the completed fabric. The sheet 5 extends around the calender roll 14 to a position where it is engaged by the metallic cables 3 in a manner to be described later. In a similar way a bank 18 of rubber mix is placed between the roll 15 and calender roll 13 and the relative rotation of the rolls sheets out the rubber to form the upper layer 4. This passes over the top of the metallic cables 3 as they pass between the calender rolls 13 and 14 to form the completed wire ply fabric. Sufficient pressure is exerted on the calender rolls 13 and 14 so that they act to force the rubber sheets 4 and 5 firmly into engagement with the metallic cables so that rubber is forced to some extent into the interstices of the individual metallic cables to bond them mechanically to the rubber. This bonding of the rubber to the cables is further strengthened by subsequent vulcanization. The completed fabric is pulled along in the direction indicated by the arrow in Fig. 1, by means of any conventional take-up mechanism (not shown). The pressure applied by the calender rolls and the speed at which they operate may be adjusted by means well understood in the art. Although the rubber sheets have been illustrated as being formed by calender rolls, it should be manifest that they may be formed by other methods known in the art as by extruding. The guiding, tensioning and straightening mechanism for the wires will now be described with particular reference to Figs. 1 and 2.

Each side wall 19 of the calender is provided with spaced brackets 20 fastened to the side walls by bolts 21 and which serve to form a guide-way for a slidable plate 22. As shown in Fig. 2, the plates are provided with outwardly extending ears 23 which slide on guide rods 24 carried by the side walls 19. The outer ends of the guide rods are threaded for receiving an adjusting nut 25. A coiled compression spring 26 is mounted on the guide rods between the ears 23 and washers 27 abutting the adjusting nuts. Pressure of the springs is adjusted by turning nut 25. The arrangement is such that the springs bias the sliding plates 22 toward the calender roll 14, the pressure exerted in this direction being adjustable in the manner indicated.

A pressure roll 28 is mounted for rotation on the movable plates 22 and is located immediately adjacent the calender roll 14. The roll is provided with a plurality of grooves 29, the number of grooves depending upon the number of cables being properly positioned in the ply fabric. The purpose of the pressure roll is to press the individual cables firmly into engagement with the rubber sheet 5 in correct relationship as the cables and sheet are drawn between the calender rolls. For the purpose of clarity, the cables are illustrated in Figs. 1 and 2 by a single line resting in individual grooves of enlarged size; in actual practice, however, the depths of the grooves 29 are equal to about one-half the diameters of the individual cables 3. This means that the cables themselves engage the rubber sheet when laid thereon by the pressure roll and that the edges of the grooves do not rest on the sheet to score or tear it.

A plurality of rotatable grooved guide rolls 30 are mounted between the plates 22. They engage the cables 3 and guide them into engagement with the pressure roll 28. As shown in Fig. 1, the individual cables are arranged in two groups the upper group being designated 31 and the lower group 32. The purpose of the guide rolls 30 is to guide the two groups or layers of cables into a single plane so that they fit in the individual grooves of the pressure roll 28. The number of grooves in each roll 30 is determined by the number of cables in the respective group 31 or 32. Since the guide rolls fan the cables out into the single plane of the pressure roll, the latter is provided with twice the number of grooves of any one guide roll 30.

A plurality of spaced tension bars 33 and 34 are rigidly supported on the mounting plates 22 in spaced parallel relationship, in the manner indicated in Figs. 1 and 2. It is essential that the guiding and tension bar 22 be grooved, as indicated at 35, so that the groups of cables 31 and 32 pass through the grooves on the upper and lower faces of the bars. This serves to further straighten and tension the cables and guide them into proper alignment with the guide rolls 30. In the form of the invention illustrated, the tension bar 34 is likewise provided with a plurality of grooves 36 to provide an additional tensioning means for the cables. The advantage of grooving the bar 34 is that a further straightening, tensioning and guiding means is provided for the individual cables. However, in certain installations, as where very fine flexible cables are used, the grooves may be omitted in bar 34, since the bars 33 and 34 still act to tension the cables. A third tension bar 37 is carried by the plate 22 and is spaced from the bar 34 in the manner indicated by Fig. 1. Preferably, the tension bar 37 is provided with a smooth surface so that any slight irregularity in the spacing of the individual cables will permit the cables to adjust themselves along the length of the bar. The number of tension bars required will be general depend on the cable construction and process used.

The series of tension bars 33, 34 and 37 form a guiding and tensioning means for the individual groups of cables 31 and 32 and insure that they are fed to the pressure roll 28 in exact parallel relationship and in a straight and somewhat tensioned condition. It will be seen that as the individual cables pass under and over the tension bars that there is a tendency for any kinks, or slight twists or bends in the wires, to be straightened out due to the tension imposed on the cables by frictional engagement with the various tension bars as the cables are pulled through the labyrinth formed by the spaced bars. The stresses placed on the cable are applied between the pressure roll 28 and the tension bars. Since these elements are all carried by the movable supporting side plates 22, the assembly acts as a unit and feeds the cables to the rubber sheets 4 and 5 in accurately spaced relationship. The pressure at which the individual wires are applied to the rubber sheet 5 is determined by the pressure applied by the springs 26 which force the positioning roll 28 into engagement with the rubber sheet as well as by the tension applied to the individual cables as they are pulled through the calender. It has been found in actual practice that the tension bars 33 and 34 make is possible to secure proper straightening and positioning of the cables without applying so much tension that the cables are pulled down to cut through the rubber skin-coat 5 as the cables are pulled along through the calendar. In other words, although the tension bars 33, 34 and 37 apply a certain amount of frictional drag to the wire and place it under tension, they function effectively to overcome the stiffness and spring properties of the wire cables.

Our invention makes it possible to manufacture a wire ply fabric in which the individual cables are embedded in a calendered sheet of rubber by means of conventional equipment now in use for the manufacture of textile ply fabric. The arrangement of tension bars may be applied to such equipment without re-arrangement or re-design of the calender mechanism. The resulting wire ply fabric is one in which the individual wire cables are perfectly centered and which may be built up into the tire carcass by manufacturing methods and equipment similar to those used with textile ply fabric.

Having thus described our invention, what we claim and desire to protect by Letters Patent is:

1. Apparatus for making tire fabric in which a plurality of wire cables are imbedded in rubber sheet material comprising, in combination, a calender including a roll for forming a rubber sheet, supporting means mounted for movement toward and away from the calender roll, a grooved roller carried by said supporting means for applying the cables against the rubber sheet on the calender roll, and a series of spaced guide bars fixed to said supporting means. the bar nearest the roller being grooved, said bars cooperating with said roller to straighten and tension the cables between the bars and roller as the cables are pulled over and under the bars prior to application to the rubber sheet.

2. Apparatus for making tire fabric in which a plurality of wire cables are imbedded in rubber sheet material comprising, in combination, a calender including a roll for forming a rubber sheet, supporting means mounted for movement toward and away from the calender roll, a grooved roller carried by said supporting means for applying the cables against the rubber sheet, a series of spaced, fixed guide bars carried by said supporting means, at least one of said bars being grooved, said bars cooperating with said roller to straighten and tension the cables between the roller and bars as the cables are pulled over and under the bars, and resilient means for biasing the supporting means together with the roller and bars toward the calender roll as a unit.

3. Apparatus for making tire fabric in which a plurality of wire cables are imbedded in rubber sheet material comprising, in combination, a calender including a roll for forming a rubber sheet, supporting means mounted for movement toward and away from the calendar roll, a grooved pressure roller carried by said supporting means for applying the cables to the rubber sheet on the calender roll, grooved guide rollers mounted on said supporting member adjacent the pressure roller and a plurality of spaced guide bars fixed to said supporting means, the guide bar adjacent the guide rollers being grooved, said bars serving to straighten and tension the cables between the pressure roller and guide bars as the cables are pulled over and under the bars while being fed to the pressure roller.

ARTHUR E. BENSON.
HAROLD S. HOWE.
CROCKETT MOSSHART.

REFERENCES CITED

The following references are of record in the file of this patent:

UNITED STATES PATENTS

| Number | Name | Date |
|---|---|---|
| 1,624,533 | Castricum | Apr. 12, 1927 |
| 1,730,657 | Hogan | Oct. 8, 1929 |
| 1,742,777 | Midgley | Jan. 7, 1930 |
| 1,862,498 | Stephens | June 7, 1932 |